Feb. 22, 1966  J. H. STRESEN-REUTER ET AL  3,236,047
TURBINE ENGINE FUEL CONTROLS
Filed May 28, 1962  4 Sheets-Sheet 3

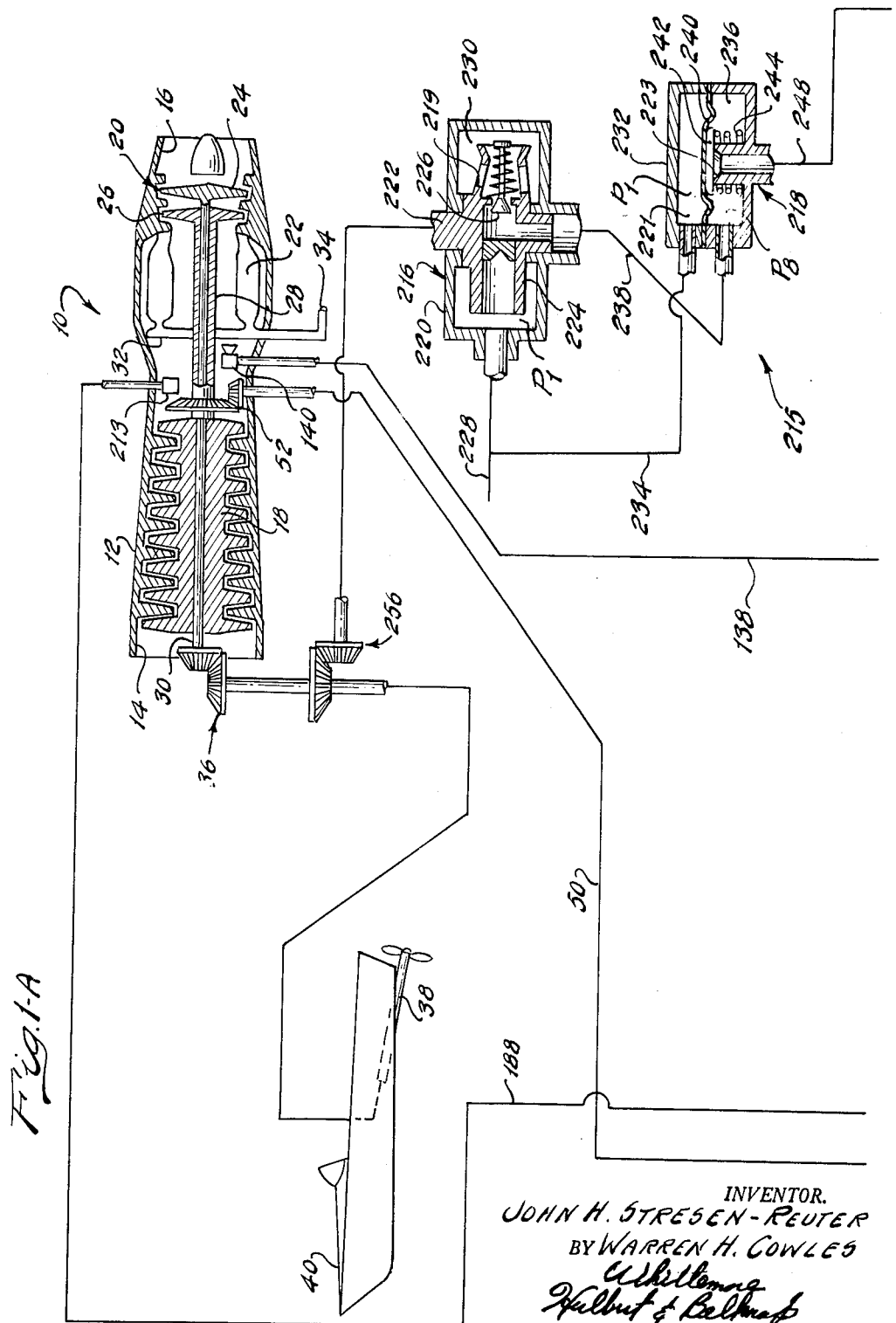

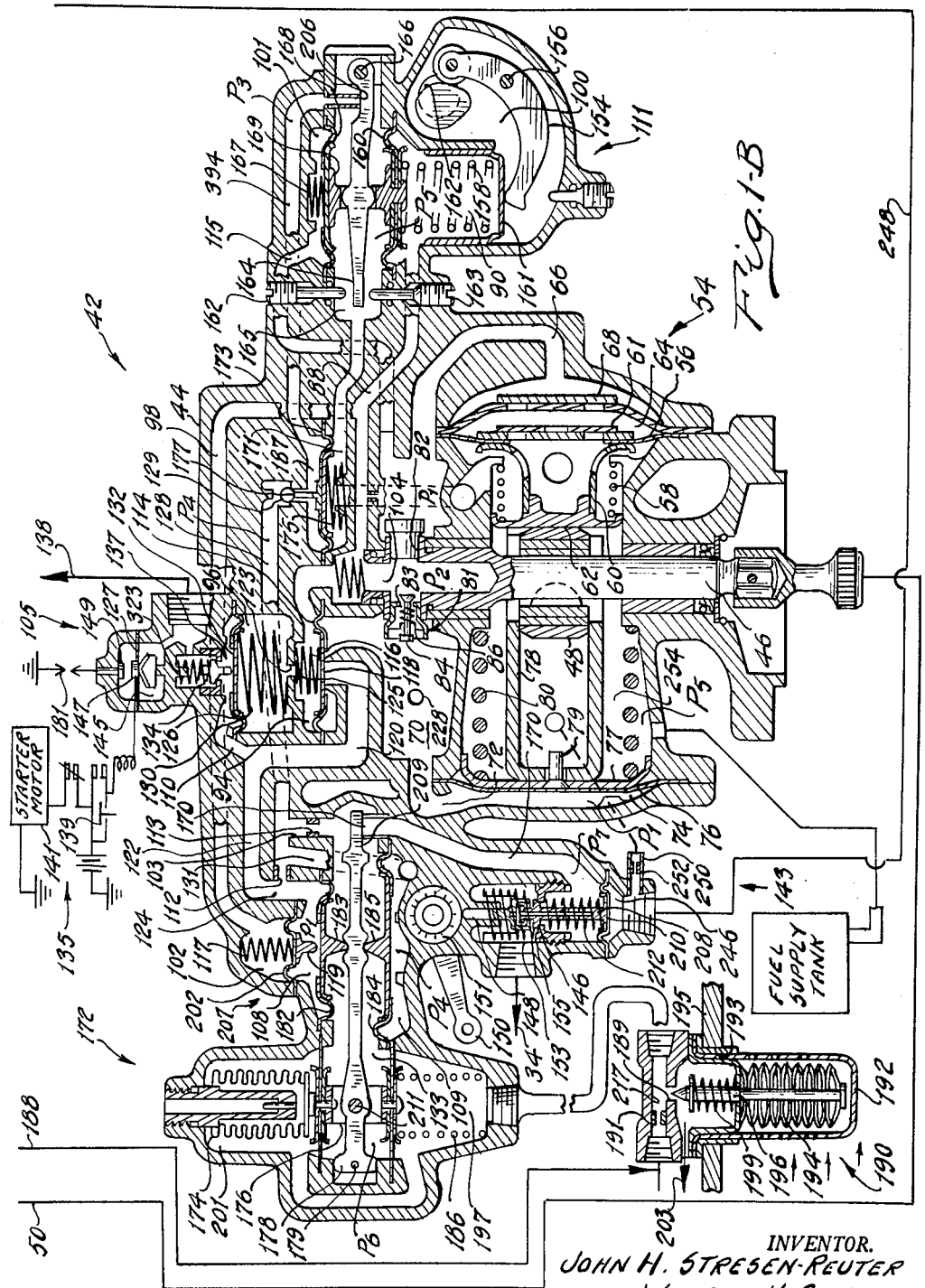

INVENTORS.
JOHN H. STRESEN-REUTER
BY WARREN H. COWLES
ATTORNEYS

INVENTOR.
JOHN H. STRESEN-REUTER
WARREN H. COWLES
BY
Whittemore, Hulbert & Belknap united States Patent Office 3,236,047
Patented Feb. 22, 1966

3,236,047
TURBINE ENGINE FUEL CONTROLS
John H. Stresen-Reuter and Warren H. Cowles, Birmingham, Mich., assignors to Holley Carburetor Company, Warren, Mich., a corporation of Michigan
Filed May 28, 1962, Ser. No. 198,158
8 Claims. (Cl. 60—39.28)

The invention relates to fuel controls and refers more specifically to improved means for metering fuel to a turbine engine wherein pumped fuel is divided into two portions one of which is metered to the engine, the other of which is recirculated including governing means for primary control of the division of the pumped fuel in accordance with engine speed between maximum and minimum limits at governed speed and separate engine parameter responsive means for primary control of the division of the fuel during engine acceleration and deceleration.

Fuel metering controls for turbine engines and the like have in the past been relatively complicated and therefore have been expensive to manufacture and maintain. Further, the fuel metering controls of the past have not been as reliable as desirable due to their complicated structure and have often been too heavy for many uses. Where uncomplicated, light, relatively inexpensive fuel metering controls have been provided in the past they have lacked the versatility required of turbine fuel controls.

It is therefore one of the objects of the present invention to provide a more versatile control for metering a substance to a device with which the control is associated between maximum and minimum limits at a rate proportional to the speed of operation of the device at the governed speed of the device.

Another object is to provide a fuel control operable to meter fuel to a turbine engine with which it is associated primarily in accordance with engine turbine speed between maximum and minimum fuel flows at governed speed and to meter fuel to the engine in accordance with engine compressor pressure during engine acceleration and deceleration.

Another object is to provide a fuel control operable to meter fuel to a turbine engine or similar device with which it is associated in accordance with engine air compressor pressure during speed decreases and increases.

Another object is to provide an engine fuel control as set forth above and further including separate means for providing additional control of the metered fuel at both low and high engine speeds and to provide a positive limit on the quantity of fuel metered to the engine.

Another object is to provide an engine fuel control as set forth above and further including means operably associated therewith for metering igniter fuel to the engine between predetermined speeds thereof only on engine start-up.

Another object is to provide an engine fuel control as set forth above and further including an emergency shut-off valve operably associated therewith to reduce the fuel metered to the turbine engine to a minimum or completely prevent fuel from being metered to the engine during periods of engine over-speed.

Another object is to provide an engine fuel control as set forth above and further including means for preventing engine start-up with the fuel control power selector lever in other than an idle position.

Another object is to provide an engine fuel control as set forth above and further including means to compensate for the effects of both altitude as indicated by compressor discharge pressure and temperature on the fuel requirements of the engine.

Another object is to provide an engine fuel control as set forth above and further including means for improving the isochronous characteristics thereof.

More specifically it is an object of the present invention to provide a fuel control operable to meter fuel to a turbine engine including means for developing a first constant pressure, means for developing a second pressure varying from said first pressure in accordance with engine turbine speed, a governing valve positioned between maximum and minimum limiting stops in accordance with the difference between the first and second pressures and the setting of a speed control operable to produce a variable third pressure and a metering valve for metering fuel to the engine in accordance with the difference between the first and third pressures at governed speed and in accordance with engine compressor pressure during engine speed acceleration and deceleration.

Another object is to provide a fuel control as set forth above wherein means are provided in conjunction with the metering valve to amplify the pressure difference between the first and third pressures.

Another object is to provide a fuel control as set forth above wherein a quantity of fuel greater than required is pumped at all engine speeds a portion of which is metered to the engine and a portion of which is recirculated in the fuel control and means for varying the amount of recirculated fuel between a maximum and minimum in accordance with engine speed at all engine governed speed settings between engine idle speed and maximum engine speed.

Another object is to provide a fuel control for metering fuel to a turbine engine or similar device including a governing system for maintaining engine speed between predetermined limits at a selected governing speed, an accelerating system for controlling the engine speed in accordance with a predetermined engine parameter and a metering valve simultaneously responsive to the governing system and acceleration system at governing speed and responsive solely to the accelerating system during acceleration and deceleration of the engine.

Another object is to provide a fuel control for a turbine engine or similar device which is simple in construction, economical to manufacture and efficient in use.

Other objects, advantages and novel details of construction of this invention will be made more apparent as this description proceeds, especially when considered in connection with the accompanying drawings wherein:

FIGURES 1A and 1B are a diagrammatic illustration of a turbine engine for installation in a boat and a fuel metering control therefor constructed in accordance with the invention.

Figure 3:
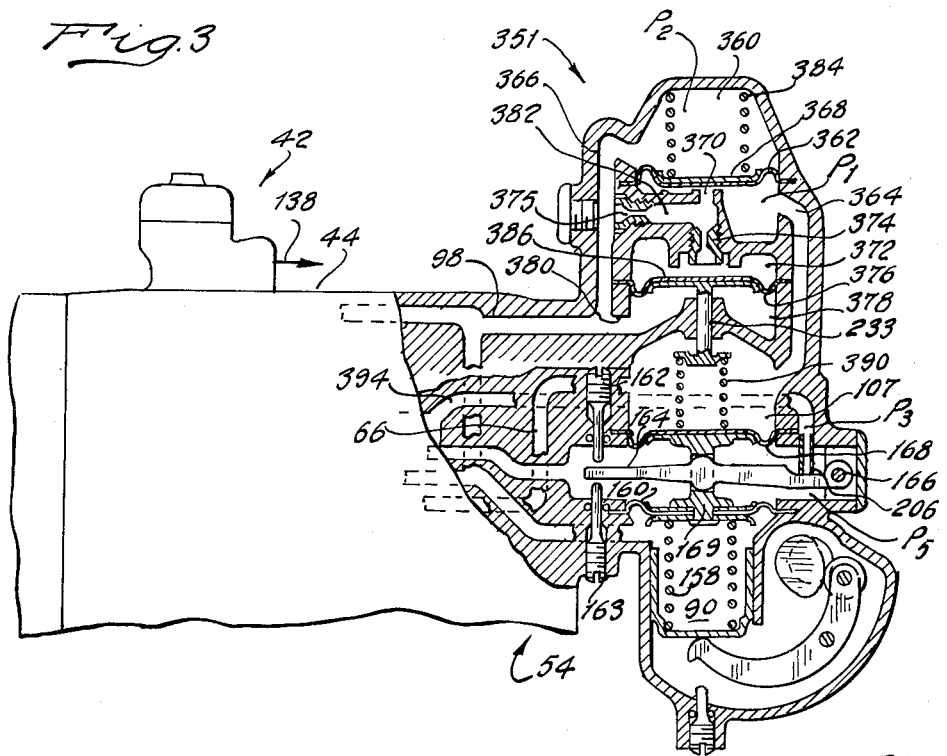
FIGURE 3 is a diagrammatic, partial view of a modification of the fuel metering control illustrated in FIGURE 1B.

With particular reference to the figures of the drawings one embodiment of the invention will now be described.

The turbine engine 10 shown in FIGURE 1A comprises a housing 12 with an air inlet 14 and an exhaust 16 containing a compressor 18 at one end and a turbine assembly 20 at the other end with a burner chamber 22 between the compressor and turbine assembly. The turbine assembly includes a power turbine 24 and a gas producer turbine 26. The power turbine 24 drives the output shaft 30 while the gas producer turbine 26 drives the compressor 18 by means of a hollow shaft 28. A fuel burner ring 32 delivers metered fuel to the burner chamber 22 as by means of a conduit 34 from the fuel control 42. The output shaft 30 of engine 10 is connected as by any suitable gear box 36 to the propeller shaft 38 schematically illustrated as being located in a boat 40.

The fuel control 42 shown best in FIGURE 1B includes a housing 44 which has a shaft 46 journaled for rotation therein. Shaft 46 includes eccentric 48 thereon. The shaft 46 is rotated as by means of any suitable transmission 50 in accordance with gas producer turbine and compressor speed as by the gear box 52.

The pump assembly 54 is located within housing 44 and includes a diaphragm 56 biased to the left by spring 58. A cup-like portion 60 having a check valve 61 therein has an abutment surface 62 which at times comes into contact with the eccentric 48. As the shaft 46 is rotated, eccentric 48 revolves therewith and causes the cup-like portion 60 and diaphragm 56 to move to the right in opposition to the bias of spring 58 by contacting surface 62. As the cup 60 so moves the fuel contained in chamber 64 is forced past a second check valve 68 into conduit 66. Check valve 68 prevents reverse flow into chamber 64 from conduit 66 on leftward movement of the cup-like portion 60.

Fuel at a relatively high pressure $P_1$ thus enters chamber 70 from where it flows by means of conduit 72 into a second chamber 74 defined generally by a diaphragm member 76 in cooperation with the houisng 44. A piston cup member 77 is positioned adjacent to the diaphragm 76 for structural support thereof and is continually urged to the left by means of spring 80. The cup-like member 78 is guided for movement transversely of shaft 46 on pin 79 which is secured to the piston cup member 77.

The purpose of the diaphragm 76 and spring 80 is to act as an accumulator in order to maintain the pressure $P_1$ relatively constant. It also assures a steady flow to all devices fed from chamber 70. This is necessary because the delivery from chamber 64 and/or line 66 is pulsating. Cup-like member 78 is a stroke control device. It measures the charge in the chamber 74 as evidenced by the position of diaphragm 76 and reduces the stroke of member 60 accordingly. Thus the addition of member 78 to diaphragm 76 and spring 80 makes the combined structure function as a stroke or delivery control device as well as an accumulator.

Thus, loosely speaking, if pressure $P_1$ should tend to increase, the increase in pressure immediately causes the diaphragm 76 and member 78 to move to the right thereby pushing surface 62 some distance to the right with it. Consequently, as shaft 46 continues to rotate the eccentric 48 will still move member 60 and therefore surface 62 which is attached thereto to the same extreme right position, but member 60 and surface 62 will not be allowed to return to the same left-most position as it had previously occupied. This in effect shortens the pumping stroke which in turn reduces the volume displaced and, since the pump is generally speaking a positive displacement pump, consequently prevents an increase in pressure. Actually the pressure does vary slightly as the diaphragm 76 yields due to packing of the control with fluid and the physical limitations of the structure since it is impossible to provide a member which could yield perfectly without resistance.

The centrifugal speed sensor 81 is carried by shaft 46 and includes a cross member 82 formed on the shaft 46 containing a valve 84 which valve is continually biased to the left as by means of a spring 86. At low speeds the fuel in chamber 70 flows relatively unrestricted through the orifice 83 controlled by valve 84; however, in so doing a pressure drop is created which causes a pressure differential of $P_1$ to $P_2$ between chamber 70 and the conduit 104 communicating with the interior of the speed sensor 81 which provides an indication of engine speed. As the speed of rotation of shaft 46 increases, the centrifugal force acting on valve 84 also increases thereby further restricting the flow of fuel through the orifice 83. Accordingly it can be seen that as engine speed increases so does the differential of pressure $P_1$ to $P_2$ and this differential varies as the square of the engine speed.

Fuel at the pressure $P_2$ flows from conduit 104 to chambers 94 and 96 and into conduit 88 which delivers the fuel at pressure $P_2$ to chambers 90 and through leakage around cup 161 to chamber 100. It is not essential that pressure $P_2$ be maintained absolutely in chamber 100 although it is generally undesirable to have a pressure differential across cup 161. Conduit 98 also delivers fuel at a pressure $P_2$ to chamber 102 by virtue of its communication with conduit 88.

Conduit 120 supplies fuel at a pressure $P_1$ to chambers 137 and 108 as by means of conduit portions 110, 122 and 124, respectively. Additionally, fuel at a pressure $P_1$ is directed to chamber 101 through conduit 115.

Governing valve assembly 111 of the fuel control 42 is provided in conjunction with the computing section 172 thereof to meter a portion of total fuel pumped by pump assembly 54 to engine 10 and to return the rest of the fuel back to the pump assembly. Specifically the governing valve assembly 111 provides a pressure $P_3$ variable in accordance with the difference in pressures $P_1$ and $P_2$ and the setting of the governed speed control cam 152 between maximum and minimum limits as determined by abutments 162 and 163 respectively all as indicated in FIGURE 1B.

The governing valve assembly 111 includes the chamber 101 which is formed by a diaphragm 168 and housing 44 and which contains therein a spring 167 normally urging the diaphragm 168 and member 169 downwardly. Chamber 90 which is also part of the valve assembly 111 is defined generally by the diaphragm member 160 along with the cup-like abutment member 161. A chamber 165 which exists on the adjacent sides of the diaphragms 168 and 160 contains therein a servo lever arm extending through member 169 and pivotally mounted in chamber 165, as by means of a pivot member 166.

Member 169 is so constructed as to require lever 164 to move along with member 169 any time that member 169 is urged either upwardly or downwardly. Adjustable stop members 162 and 163 are provided as limitations on the degree to which lever 164 may be caused to move.

Pressure $P_5$ which exists in chamber 165 is the low return pressure which exists in chamber 254 of pump assembly 54. Additionally, pressure $P_5$ is also communicated as by means of suitable conduitry to chamber 171 which is defined generally by the housing 44 and a diaphragm member 173. Diaphragm 173 which is urged upwardly as by means of a spring 175 has an abutment member 177 connected thereto operable to urge the ball valve 129 upwardly away from its coacting seat for purposes to be described later.

Chamber 187 which is formed on the opposite side of diaphragm 173 from chamber 171 is connected to conduit 394 which is in controlled communication with chamber 165 as by means of the coaction of surface 206 on lever 164 acting as a valving surface. The pressure in conduit 394 is at some value $P_3$ which is less than $P_1$ but greater than $P_5$.

The fuel control 42 further includes means 105 for furnishing igniter fuel to the engine 10 only on engine start-up and at engine speeds preselected for a particular engine of for example between ten and thirty percent of maximum engine speed, and means 143 operable in conjunction with the means 215 for preventing engine damage due to power turbine overspeed for providing minimum fuel flow to the engine during overspeed to prevent engine flame-out, for shutting down the engine 10 by stopping all fuel flow thereto when desired and for preventing engine start-up with the power selector lever 150 in other than an idle position.

The means 105 for furnishing igniter fuel to the engine 10 includes diaphragm 114 and its valving element 118 which are urged downwardly by spring 116 thereby closing the orifice to conduit 120. As illustrated in FIGURE 1B pressure $P_2$ exists on the upper surface of diaphragm 114 while pressure $P_1$ exists over most of the lower surface thereof. As soon as the engine attains approximately ten percent of maximum speed, pressure $P_2$ is diminished sufficiently so as to allow pressure $P_1$ to exert force sufficient to move the valving element 118 and diaphragm 114 upwardly against the action of spring 116 thereby opening the orifice to conduit 120. Consequently, fuel at a pressure $P_1$ flows into chamber 137 and since spring 130 is sufficiently strong to keep valve 134 in an open position at this time, the fuel continues to flow from chamber 137 past valve 134 and through conduit 138 to the igniter schematically illustrated at 140.

The fuel may continue to flow for example until the engine reaches approximately thirty percent speed at which time pressure $P_2$ in chamber 96 will have been sufficiently diminished so as to allow pressure $P_1$ in chamber 137 to overcome the combined force resulting from pressure $P_2$ and spring 130. The abutment member 132 will then be moved downwardly thereby permitting valve 134 to close whereby fuel flow through conduit 138 is terminated.

Valve 118 reduces pressure $P_1$ only during a short period at engine start and shut-down. The valve is not intended to be a metering valve but is rather an on-off pressure actuated valve.

It will be recognized that the engine speed at which the indicated igniter action takes place may be varied from the example of ten and thirty percent. Actually any speed values can be predetermined for specific engine requirements.

The means 105 for furnishing igniter fuel to the engine 10 further includes the flapper valve spring 125 positioned over the orifice 123 between chambers 94 and 96. Spring 125 prevents a rapid rise in pressure in chamber 96 on engine shut-down so that the igniter system does not supply igniter fuel to the engine between thirty and ten percent engine speed on engine shut-down as it did on engine start. Fuel puddles resulting from igniter fuel being pumped to the engine with the engine at low speeds which fuel is not ignited due to insufficient air and consequent engine fires or hot spots and fuel vapors in the engine are thus prevented.

Thus in operation, on engine start a short time, in the order of a minute or two is required to leak fuel into chamber 96 past valve 125 as pressure is lowered in chamber 94. The operation of engine 10 is only slightly effected by valve 125 on engine start. On engine shut-down however the valve 125 causes the pressure in chamber 96 to lag the rising pressure in chamber 94 so that valve 134 is held closed by spring 323 until the engine is at a speed so low that igniter fuel is not pumped.

The fuel control 42 further functions to regulate the operation of apparatus 135 controlling the automatic starting cycle of the engine. Temperature and pressure compensating means 190 and 172 are also provided in conjunction with the fuel metering control 42 as well as means 351 illustrated in FIGURE 3 for increasing the isochronous characteristics of the fuel control.

Apparatus 135 external of the fuel control 42 for controlling an automatic engine starting cycle in accordance with the igniter fuel supply is illustrated diagrammatically in FIGURE 1B. Apparatus 135 does not form a part of the present invention except as it is under the control of the igniter fuel supply. It will therefore be considered only briefly.

Apparatus 135 is operable on ignition push button switch 139 being pressed to energize the starter motor 141 which brings the engine 10 up to ten percent engine speed in the indicated example. As previously indicated fuel is then pumped through conduit 138. Until conduit 138 is filled with fuel the pressure in chamber 145 will be relatively low so that the contacts 147 and 149 supported on the diaphragm 127 and housing 44 will be open preventing electrical energy from reaching the igniter plugs 181 of the apparatus 135. When line 138 is filled with igniter fuel the pressure in chamber 145 builds up to close the contacts 147 and 149 and permit firing of the igniter plugs 181 and ignition of the igniter fuel. When the engine reaches sustaining speed or thirty percent of engine speed in the present example and igniter fuel flow to conduit 138 is cut off the pressure in chamber 145 is lowered to open contacts 147 and 149 and prevent firing of the igniter plugs 181. The fuel in chamber 145 passes through the igniter nozzles to the engine on closing valve 134, thus lowering the pressure in chamber 145.

The computing section 172 of the fuel control is operable to control the fuel metered to the engine in accordance with the difference in pressure between pressure $P_1$ and a pressure $P_4$ derived from pressure $P_3$ by ball valve 129 in conjunction with abutment 177 when the engine is operating at governed speed. When the engine speed is accelerating or decelerating and lever 164 is in contact with the abutment 162 or 163 the fuel is metered to the engine 10 in accordance with the compressor discharge pressure of engine 10. Speed bias means 207 are also provided in conjunction with the computing section 172 of the fuel control 42 to provide added control of the fuel flow at both low and high engine speeds.

The computing section 172 of the fuel control 42 includes the chambers 108, 109 and 133 and the lever 178. Bellows 174, spring 186 and the conduits having restrictions therein as shown connecting the indicated elements complete the computing section of the fuel control.

Fuel at a pressure $P_1$ flows through conduits 122 and 124 thereby entering chamber 108 which is determined generally by diaphragm 182 and a diaphragm 202 in cooperation with the housing 44. Conduit 128, containing a restriction 112 therein, communicates between conduit 124 and chamber 187. Ball valve 129 as will be explained in greater detail subsequently varies the actual degree of communication between conduit 128 and chamber 187.

Chamber 109 defined generally by diaphragm 184 and member 185 cooperating with the housing 44 communicates with conduit 128 downstream of restriction 112 as by means of a conduit 131. The effective area of diaphragm 184 is greater than that of diaphragm 182.

Since conduit 131 is downstream of restriction 112 the pressure drop across that restriction will be reflected in the difference in pressure between chambers 108 and 109. That is, for example, if ball valve 129 should be moved upwardly some amount allowing greater fuel flow from conduit 128 into chamber 187 it is apparent that the pressure $P_4$ existing in conduit 128 will be reduced somewhat because of the restriction to flow caused by restriction 112, and this reduction will be reflected in chamber 109.

The chamber 133 which is formed generally by the housing 44 and the adjacent sides of diaphragms 182 and 184 is at pressure $P_6$ which is less than pressure $P_4$ but greater than the discharge pressure $P_7$. Chamber 133 is in communication with conduit 128 by means of conduit portion 103 having a restriction 113 therein. Additionally, chamber 133 is in controlled communication with a metered fuel discharge conduit 170.

Lever 178 pivotally secured at one end to the housing 44 as by means of a pivot member 179 has a valving surface 209 formed on its other end which is adapted to control the flow from chamber 133 into conduit 170. Intermediate the ends of lever 178 is a second pivot member 211 secured to a force transfer member 176 which in turn is secured to an evacuated bellows 174. A spring 186 is located on the opposite side of lever 178 and is provided primarily for purposes of calibration.

Spring 186 normally urges the lever 178 in a generally counterclockwise direction about its pivot 179. Compressor discharge pressure as sensed by probe 213 is communicated as by means of conduit 188 to chambers 197 and 201. It will be noted that as compressor discharge pressure increases, the evacuated bellows 174 will tend to collapse causing the lever 178 to be rotated in a counterclockwise direction about pivot 179.

In addition to the forces exerted by spring 186 and bellows 174, diaphragms 182 and 184 along with their respective members 183 and 185 also exert forces on lever 178 in accordance with the pressure differential $P_1 - P_4$ on the opposite sides thereof so as to determine the proper opening as between the valving surface 209 and conduit 170.

Provision is also made so as to alter the compressor discharge signal to bellows 174 in accordance with any desired temperature such as atmospheric or regenerator out temperature. This is accomplished by means of a temperature compensating valving assembly 190 which includes a housing 192 connected serially in conduit 188 so as to provide a separate conduit portion 217 containing a restriction 191 therein. A second conduit portion 189 adapted to be controlled by a valve 196 communicates with conduit 217 downstream of the restriction 191. Bimetallic discs 194 are provided so as to vary the position of valve 196 in accordance with desired temperature. Housing 192 is inserted in opening 193 in the wall 195 of a regenerator or the engine 10 to expose the bimetallic members 194 to the desired temperature. A spring 199 urges the valve 196 into closing relation with valve orifice 189 and may be used for purposes of calibration.

The reason for providing an assembly 190 is of course to vary the rate of metered fuel flow in accordance with air temperature; that is, for any particular compressor discharge pressure the metered fuel flow must be altered in accordance with variations in air temperature. This is required because the same quantity or mass of air assumes a greater volume and a correspondingly greater pressure signal at high temperatures which in turn would couse overly rich fuel air mixture if not compensated for. Accordingly, if air temperature increases, the bimetallic members 194 will move the valve 196 further away from conduit portion 189 allowing some of the pressure to bleed out of conduit 217 through conduit 203 and into the atmosphere.

The means 215 for preventing engine damage due to power turbine overspeed such as for example would occur on removing the propeller of shaft 38 from the water comprises the speed sensor 216 and the shut-off valve assembly 218. The speed sensor 216 and shut-off valve assembly 218 operate in conjunction with the means 143 for providing minimum fuel flow to the engine during engine overspeed.

The speed sensor 216 is comprised generally of an outer stationary housing 220 having a shaft 222 rotatable therein as by means of gear box 256 operatively connected to the power turbine 24 through gears 36 and shaft 30. A cross member 224 having a valve 226 and coacting orifice therein is formed on shaft 222 and adapted to be rotated within chamber 230 of housing 220. Fuel at a pressure $P_1$ is communicated as by means of conduit 228 to chamber 230 from where is flows through orifice 219 past the valve 226 into conduit 238.

The throttling or shut-off valve assembly 218 includes a housing 232 containing a diaphragm 240 which has a valving member 242 secured thereto which serves to divide the interior of the housing into two distinct chambers 221 and 236. Chambers 221 is maintained at a pressure $P_1$ by conduit 234 which communicates between conduit 228 and chamber 221 while chamber 236 is maintained at some variable pressure $P_8$ indicative of the speed of rotation of shaft 222. Spring 244 is provided in chamber 236 so as to continually bias the valve member 242 upwardly away from its coacting orifice 223 which forms one end of conduit 248 whose other end communicates with chamber 246.

During normal operation diaphragm 240 and valving member 242 will be maintained in an upper position since pressure $P_8$ which at this time may be regarded as being relatively high, plus the force of spring 244 combine to create a force sufficient to overcome the force of pressure $P_1$. Consequently, pressure $P_8$ is communicated to chamber 246 by means of conduit 248 thereby urging the diaphragm 210 upwardly and permitting fuel flow around valve 155.

If overspeed of the power turbine 24 occurs, the speed of rotation of shaft 222 will be materially increased causing a greater centrifugal force to be developed by valve 226 thereby reducing the flow therethrough and consequently reducing the value of pressure $P_8$. As a result of pressure $P_8$ being reduced, diaphragm 240 and valving member 242 are forced downwardly against the action of spring 244 thereby terminating flow through orifice 223 and conduit 248. As flow is terminated, the pressure in chamber 246 is reduced to the low return pressure $P_5$ by means of conduit 250 which contains a restriction 252 therein. As a result thereof, spring 212 forces member 208 and diaphragm 210 downwardly causing the valve 155 to seat on valve seat 146 thereby terminating the fuel flow between the valve 155 and valve seat 146.

Figure 2:
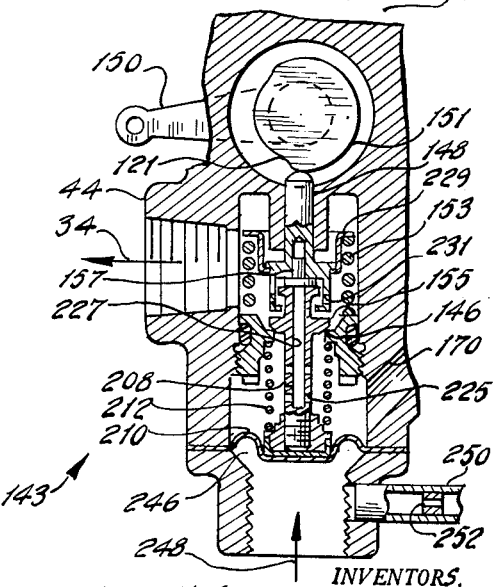
FIGURE 2 is an enlarged view of a portion of the fuel metering control illustrated in FIGURE 1B.
Figure 6:
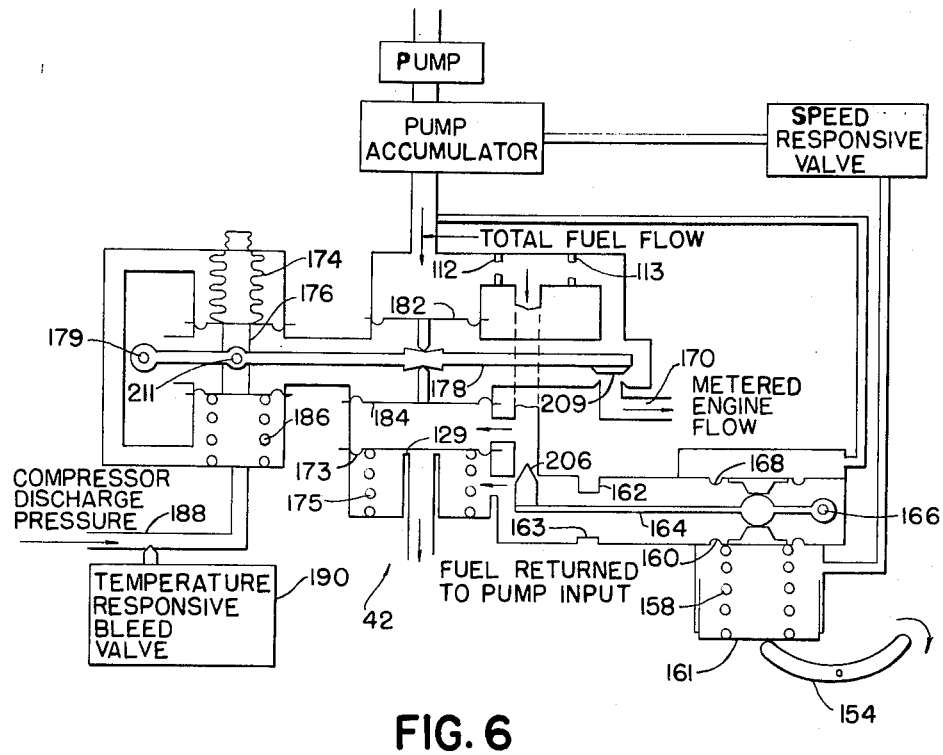
FIGURE 6 is a simplified diagrammatic illustration of the fuel metering control illustrated in FIGURE 1B.

However, although it could be and probably would be if the fuel control were used in conjunction with a stationary power plant, all fuel flow through means 143 in the embodiment of the invention shown is not terminated at this time, since member 208 contains a plurality of radially formed passages 225 shown best in FIGURE 2 which serve to communicate metered fuel to the axial passageway 227. Since the cup-like member 229 is held in its uppermost position, as determined by the cam 151, by means of spring 153 the fuel continues to flow from passageway 227 through radially formed ports 231 into the discharge conduit 34 leading to the burner ring 32.

The fuel flow through passage 227 is sufficient only to prevent engine flame-out which would occur if all fuel were prevented from reaching the engine during power turbine overspeed. When the overspeed is subsequently corrected, as by increase in engine load, valve 242 will again be raised allowing pressure $P_8$, now of greater value, to be once more communicated to chamber 246.

Means 143 for providing minimum fuel flow to the engine during engine overspeed further functions to prevent start-up of the engine at other than idle speed. Thus a safety feature is provided in the fuel control 42 to prevent inexperienced engine operators from starting the engine at a high power setting which could result in serious accidents since the engine may attain full speed in so short a time under such circumstances that control of the vehicle in which the engine is mounted may be lost if the early speed is not expected.

Thus on engine start-up the fluid pressure in chamber 246 is low since no fuel is pumped in the fuel control 42 before engine start. The valve member 208 is at this time biased downwardly by spring 212 as far as the member 148 which is biased into engagement with cam 151 by the stronger spring 153 will allow it to be. In all positions of the cam 151 except when the member 148 rests in the idle position 121 on the cam the spring 212 is permitted to completely close valve member 208 before pressure builds up in chamber 246 on engine start-up. Thus the engine may be started only with the lever 150 in the idle position since some time, in the order of minutes, is required after the engine is started before fluid pressure builds up in chamber 246.

Further another safety feature may be incorporated in the fuel control 42 if the chamber 246 is connected so that the diaphragm 246 is responsive to the engine oil supply rather than or as well as to the fuel supply. In such case the metering of fuel to the engine would be reduced to a minimum on loss of oil pressure to immediately reduce engine speed and prevent damage to the engine 10 due to operation of the engine without oil.

OPERATION

The over-all philosophy of operation is based on the equation:

$$W_{f0} = W_{f1} + q$$

wherein:

$W_{f0}$ = total fuel flow through conduit 122 at a pressure $P_1$
$W_{f1}$ = fuel flow through restriction 113 (which equals metered fuel flow)
$q$ = that quantity of fuel returned to the low pressure as through valve 129.

In other words, total fuel flow as delivered through conduit 122 is comprised of two basic fuel flows, that is, the fuel flow past restriction 113 and the fuel flow past ball valve 129. Another way of stating this broadly is to say that a pump 54 continually supplies an overabundance of fuel at a constant pressure of $P_1$ which fuel is metered to the engine in accordance with certain operating parameters by determining the quantity that is in excess of that required and by returning this excessive quantity back to the lower return pressure $P_5$.

In operation the fuel control of the invention functions to govern engine speed between limits as determined by adjustable stops 162 and 163 at a speed selected by rotation of lever 150. In addition the fuel control of the invention is operable to provide acceleration and deceleration control of engine fuel through the computer section 172 in accordance with engine compressor pressure.

The acceleration system as embodied in the computer section 172 and the governing system as embodied in the governing valve assembly 111 operate simultaneously during governing of engine speed. Thus during governing the governing system sends a pressure signal back to the acceleration system as a function of speed error as will be seen subsequently. In contrast, during acceleration or deceleration, the acceleration system is substantially independent if the governing system since the lever 164 is held against fixed stop 162 or 163 during acceleration or deceleration.

The independent operation of the acceleration system will be more readily understood after a consideration of the forces acting on lever 178 during acceleration or deceleration.

Referring to FIGURE 1B, with the flow through restriction 112 equal to $W_{f0}$, it will be seen that the pressure differential $P_1-P_4$ acting in a downward direction on the lever 178 through the members 183 and 185 will be proportioned to $(W_f+q)^2$ which is equal to $$W_f^2 + 2qW_f + q^2$$

since the pressure drop across an orifice is proportional to the square of the fluid flow therethrough. Further since the diaphragm 184 has a diameter larger than the diaphragm 182 there will be an upward force acting on the lever 178 through the member 185 proportional to the square of the fuel flow through the orifice 113 or $W_f^2$. The spring 186 produces an upward force on the lever 178 at pivot 211 which may be chosen to be proportional to $q^2$ with the lever 164 engaging an abutment 162 or 163. The other force acting on the lever 178 is provided by the bellows 174 and is equal to $a_1Pc$ where $a_1$ is the area of the bellows and $Pc$ is compressor pressure.

Considering that with proper selection of bellows area, diaphragm diameter and spring force, the moments produced about the pivotal mounting 179 acting on the lever 178 due to the $W_f^2$ term and the $q^2$ term acting through member 183 are cancelled by the force proportional to $q$ provided by spring 186 and the $W_f^2$ term acting through the member 185, during acceleration or deceleration the total moment about pivot mounting 179 acting on the lever 178 during acceleration can be expressed by the following equation $$2qW_f a_0 L_1' = P_c a_4 L_2$$

where $a_0$ is the area of the diaphragm 182 $L_1$ is the distance from the pivot point 179 to the point of contact with the lever 178 of the members 183 and 185 and $L_2$ is the distance between the pivot mounting 179 and the pivot 211. Rearranging this equation it can be seen that $$W_f = \frac{a_4 L_2}{2 q a_0 L_1} P_c = \frac{K}{q} P_c$$

Thus it will be seen that with $q$ a constant due to the steady state position of the lever 164 in engagement with the abutment 162 or 163 that the fuel flow during acceleration or deceleration of the engine is controlled in accordance with compressor pressure only.

On deceleration $q$ will of course be a larger quantity than it is on acceleration. Therefore if the spring 186 is chosen to counteract the $q^2$ force acting on the lever 178 during acceleration, the same spring will not exactly counteract the $q^2$ force acting on the lever 178 on deceleration but will provide an added constant in the above equation so that the fuel flow will be proportional to compressor discharge pressure plus a constant on deceleration.

Specifically, considering the governing operation of the fuel control, let it be assumed that the engine is operating under steady state conditions and that the elements have assumed their respective positions as illustrated. Now let it be further assumed that engine speed increases without movement of the power selector lever 150. $P_2$ will as a consequence be reduced with respect to $P_1$ causing lever 164 to rotate counterclockwise about its coacting pivot 166. Rotation of lever 164 in a counterclockwise manner as described will cause the valving surface 206 formed on lever 164 to move away from the open end of conduit 394 thereby restricting to a lesser degree the flow therefrom.

As flow through conduit 394 is so increased pressure $P_3$ decreases to some new value which in turn permits diaphragm 173 to move upwardly to balance the action of spring 175 and pressure $P_5$ in chamber 171. As the diaphragm so moves, member 177 moves upwardly with it allowing the ball valve 129 located generally in conduit 128 to increase the flow from conduit 128 to chamber 187.

Consequently pressure $P_4$ in conduit 128 and in conduit 131 conduit portion 103 and in chamber 109 decreases to some new value further from pressure $P_1$. It must be remembered throughout the discussion, that pressure $P_1$ is a high and substantially constant pressure so that in all cases where valving is employed, the control of flow through orifices of the system is brought about by the raising and lowering of the downstream pressure instead of raising or lowering the upstream pressure.

As a result of pressure $P_4$ decreasing and because diaphragm 184 has a substantially greater effective area than does diaphragm 182, an off-balance force is created and transmitted through member 185 which causes lever 178 to rotate clockwise about its pivot 179 thereby moving the valving surface 209 closer to the port controlling the entrance to conduit 170. Consequently, since the flow to conduit 170 is now restricted to a greater degree, a lesser flow of metered fuel will result, and the engine speed is returned to the governed speed at which time the pressure $P_2$ will be such as to cause the lever 164 to move to a position wherein the fuel flow through conduit 170 will be sufficient to maintain the governed engine speed.

In cases of engine speed decreasing from governed speed without movement of lever 150 and converse of the above operation with respect to the pressure $P_3$ and $P_4$ is then of course true.

To produce engine speed acceleration in accordance with the above discussion the power selector lever 150 which is operatively connected to cam 152 is rotated so as to cause the follower 154 to rotate clockwise about its pivot 156. As follower 154 is so rotated, cup 161 and spring 158 are urged upwardly thereby causing lever 164 to rotate clockwise about a coacting pivot 166 to abut against stop 162. With the lever 164 abutting against stop 162 in accordance with the above discussion the orifice controlled by valve 129 and pressure $P_4$ will be constant. As engine speed increases so does compressor discharge pressure. Accordingly, during this period of acceleration compressor discharge pressure is the controlling factor until a predetermined speed is attained at which the pressures $P_1$ and $P_2$ cause the lever 164 to be disengaged from the abutment 162 at which time lever 164 is the overriding control. The predetermined maximum fuel flow can of course be varied manually by adjusting the stop 162.

The operation of the fuel control of the invention during deceleration with the lever 164 abutting the stop 163 is analogous to the operation thereof during acceleration and will not therefore be considered in detail.

Thus it will be seen that at any governed speed the lever 164 will move between stops 162 and 163 in accordance with engine gas producer turbine speed to provide governing action. In addition during engine speed acceleration or deceleration when the lever 164 is moved into contact with stop 162 or 163 the orifice controlled by valve 129 is constant as is pressure $P_4$. The orifice and pressure will of course be at opposite limits depending on which of stops 162 or 163 the lever 164 engages. Therefore by choosing proper spring forces and diaphragm areas in the computing section 172 of the fuel control at these times as previously indicated the movement of lever 178 is directly controlled by the compressor discharge pressure as sensed by probe 213.

During operation the computing section 172 multiplies the signal generated by the pressure drop of $P_1$ to $P_4$ across restriction 112. That is, instead of the forces generated by the pressures in chambers 109 and 108 varying directly with fuel flow across restriction 112, they vary by some other factor by virtue of the difference in areas of diaphragms 182 and 184.

As a consequence, the fuel control 42 can be made to "believe" that a larger quantity of fuel is being bypassed through valve 129 than is actually the case. This is a distinct advantage since "$q$" in the above equations can therefore be made a relatively small quantity which in turn reduces the energy which has to be supplied in pumping it through the system and materially reduces the heating effect of recirculation.

The speed bias means 207 is provided in conjunction with the computing section 172 and acts on lever 178 during low speed engine operation to rotate the lever 178 in a clockwise direction and thus reduce the fuel flow into conduit 170. Thus the abutment 119 engages member 183 supported by diaphragm 182 to impart a bias due to speed bias spring 117 to lever 178 at low engine speeds since the pressure in chamber 102 is high relative to the pressure in chamber 108 at low engine speeds. The bias of spring 117 is removed from lever 178 as the engine speed increases and pressure $P_2$ decreases with respect to pressure $P_1$.

When it is desired to shut down the turbine engine 10 by cutting off all fuel to the engine the lever 150 is moved to rotate the cam 151 and move the cam follower 148 downward in FIGURES 1A and 2 in opposition to the spring 153. The valve 157 will thus close the minimum fuel requirement passage 227. Further rotation of the cam 151 will produce downward movement of the member 208 and diaphragm 210 in opposition to the pressure in chamber 246 until the annular passage between valve 155 and valve seat 146 is closed. All fuel flow to the engine 10 is cut off at this time to shut down the engine.

The modification of the invention illustrated in FIGURE 3 includes a reset mechanism 351 employed to give the fuel control 42 almost isochronous governing characteristics. The reset mechanism 351 includes a first chamber 360 containing a spring biased diaphragm member 362 the opposite sides of which are exposed to pressures $P_2$ and $P_1$ as by means of conduit 366 and 364 respectively. Diaphragm 362 also has a valve member 368 associated therewith for controlling the flow from conduit 364 to conduit 370 which communicates with chamber 372. A restriction 374 contained within conduit 370 is provided primarily as a damping device.

Diaphragm 376 which forms one wall of chamber 372 has its opposite side exposed to pressure $P_2$ as communicated to chamber 378 by means of conduit 380. An additional conduit 382 containing a restriction 375 therein communicates between conduits 370 and 366.

If, for example, engine load should be reduced causing engine speed to increase, the change in pressure differential between pressures $P_1$ and $P_2$ would cause diaphragm 362 and valve 368 to move upwardly thereby allowing a greater flow through conduit 370.

Consequently, the pressure in chamber 372 is increased because of restriction 375 causing diaphragm 376 to move downwardly against the resiliently biased abutment member 233. As the member 233 so moves, spring 390 is compressed to some degree thereby increasing the downward force on diaphragm 168 and lever 164.

Thus the reset mechanism 351 enables the lever 164 to be positioned between the stops 162 and 163 with a very small increase in the pressure difference $P_1-P_2$. The reset mechanism 351 is desirable due to the requirement that the rate of spring 158 be large to provide required governor speed range. In the reset mechanism 351 the spring 384 and diaphragm 362 constitutes a single speed governor so that the spring 384 may have a relatively light spring rate and the single speed governor can be made to operate a servo system including the valve opening 370 and restriction 375 which amplifies the change in pressure $P_1-P_2$. The sensitivity of the governor structure 111 is further increased by providing a large diaphragm 376 to further amplify the change in pressure $P_1-P_2$.

Figure 4:
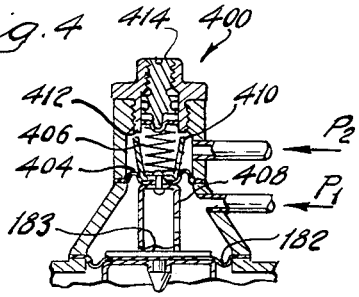
FIGURE 4 is a diagrammatic, partial view of another modification of the fuel metering control illustrated in FIGURE 1B.
Figure 5:
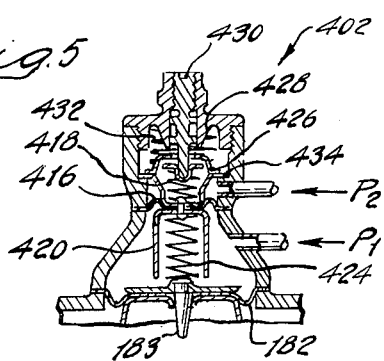
FIGURE 5 is a diagrammatic, partial view of still another modification of the fuel metering control illustrated in FIGURE 1B.

Further modifications of the invention are shown in FIGURES 4 and 5. The structure in FIGURE 4 is intended to replace the speed bias means 207 shown in the fuel control 42 of FIGURE 1B and functions to provide bias for the lever 178 at low engine speeds. The structure of FIGURE 5 is also intended to replace the means 207 and diaphragm 202 of FIGURE 1B and functions to provide bias for the lever 178 at both low engine speeds and high engine speeds.

The speed bias structure 400 of FIGURE 4 includes the diaphragm 404 similar to the diaphragm 202 of FIGURE 1B and the biasing spring 406 similar to spring 117 of FIGURE 1B. A pair of oppositely opening cup shaped members 408 and 410 are secured to the diaphragm 404 as shown best in FIGURE 4. The open end of the cup shaped member 408 is engageable with the member 183 secured to the diaphragm 182 which member and diaphragm are given the same numbers as their corresponding components in FIGURE 1B. An abutment 412 is provided in housing 44 to provide a positive stop for upward movement of the cup shaped member 410. The bias of spring 406 is adjustable by means of the adjusting screw 414.

In operation at low engine speeds when the pressure difference $P_1-P_2$ is low the spring 406 urges the cup shaped member 408 into contact with the member 183 which in turn biases the fuel control member 178 in a clockwise direction. As the speed of the engine increases and the pressure difference $P_1-P_2$, becomes larger due to dropping of the pressure $P_2$, the pressures $P_1$ and $P_2$ acting on the diaphragm 404 cause the cup shaped members 408 and 410 to be moved upwardly until cup shaped member 408 is completely disengaged from the member 183. All bias of the spring 406 is therefore removed from the lever 178. In the upward movement of the cup shaped members 410 and 408 a positive stop is provided by the abutment 412. Thus the speed bias structure of FIGURE 4 besides providing bias for the lever 178 at low engine speeds further provides a positive stop or limit for the counterclockwise movement of the lever 178.

The speed bias structure 402 of FIGURE 5 again includes a diaphragm 416 and spring bias 418 similar to the diaphragm 202 and bias spring 117 of the fuel control illustrated in FIGURE 1B. The speed bias 402 of FIGURE 5 further includes the cup shaped members 420 and 422 associated in the same manner that the cup shaped members 408 and 410 of FIGURE 4 are with the diaphragm 182 and member 183. Also included in the structure 402 is the spring 424 operable to transfer the bias of spring 418 to the member 183 and a second cup shaped member 426 and bias spring 428 concentric with and through which the adjusting screw 430 extends.

In operation the cup shaped member 426 provides a positive abutment for the cup shaped member 422 in its upward travel and in turn the abutments 432 provide a positive stop for the cup shaped member 426 in its upward travel. Thus at low engine speeds, as the pressure difference $P_1-P_2$ increases the cup shaped members 420 and 422 are gradually moved up reducing the bias applied to the member 183 and therefore the lever 178 by the spring 424 until at some still relatively low engine speed the cup shaped member 422 engages the cup shaped member 426 after which over a large portion of the speed range of the engine the bias provided on member 183 by spring 424 is relatively constant. Then at high engine speeds the pressure difference $P_1-P_2$ is sufficiently large that the cup shaped member 426 is moved from the position shown wherein it rests on abutment 434 under bias of spring 428 into contact with the fixed abutment 432. The bias on the member 183 is thus further reduced at high engine speeds and again the abutments 432 provide a positive upper limit to the clockwise movement of the lever 178.

Thus it will be seen that in accordance with the invention there is provided a fuel control 42 which is simple, economical and reliable in which speed governing is accomplished through metering fuel to an engine in accordance with engine speed as sensed by the speed sense 81 and probe 213 with the probe 213 controlling during engine acceleration and deceleration. Governing of the engine at speeds set by positioning of follower 154 is accomplished by movement of lever 164 between adjustable stops 162 and 163.

Further, while one embodiment and modifications of the invention have been disclosed in detail it will be understood that other embodiments and modifications thereof are contemplated. It is the intention to include all such embodiments and modifications as suggest themselves from the above disclosure within the scope of the invention.

Thus the invention is not to be limited to use on an engine adapted to propel a boat. On the contrary, the invention can be employed on an aircraft without any changes except possibly calibration so as to suit the requirements of the particular engine since altitude compensation is provided by the evacuated bellows 174. Use of the invention is also contemplated in conjunction with automobiles, trucks, stationary engines and other similar devices. Also it will be understood that any desired pressure signal other than compressor pressure may be used as a control parameter in chambers 197 and 201.

The drawings and the foregoing specification constitute a description of the improved turbine engine fuel controls in such full, clear, concise and exact terms as to enable any person skilled in the art to practice the invention, the scope of which is indicated by the appended claims.

What we claim as our invention is:

1. A fuel control for metering fuel from a fuel supply to an engine comprising a fuel conduit between the fuel supply and the engine, a first restriction in said fuel conduit, means for pumping fuel in quantities in excess of engine requirements through said first restriction, a speed sensor in series with said pumping means before the first restriction for producing a pressure difference thereacross, a second restriction in said fuel conduit, means connected to said fuel conduit between said first and second restriction and responsive to said pressure difference for returning a portion of the pumped fuel to the means for pumping fuel in accordance with a selected engine governing speed and the actual speed of the engine to regulate the quantity of fuel passed through the second restriction and metered to the egnine to predetermined required engine fuel, and means positioned between the second restriction and engine responsive to fuel pressure on both sides of the first restriction for further regulating the quantity of fuel metered to the engine in accordance with an engine parameter other than speed during engine acceleration and deceleration.

2. A fuel control for metering fuel to a turbine engine which engine includes an air compressor comprising a source of fuel under pressure in quantities in excess of the volume of fuel required by the engine, governing means positionable primarily in response to a controlling engine parameter between predetermined fuel flow limits, valve means responsive to the position of said governing means for recirculating a controlled portion of the fuel and metering means responsive to said valve means for supplying the remaining portion of the fuel to the engine comprising a valve orifice through which fuel for the engine must pass, a metering lever pivotally mounted at one end and having a valve in closing relation to the valve orifice at the other end and a plurality of means responsive to engine parameters acting on said lever between the ends thereof for pivoting the lever about the one end thereof to vary the degree of opening of the valve orifice including a pressure responsive bellows connected to said lever for movement thereof on change of pressure surrounding the bellows and means for exposing the bellows to the engine air compressor discharge pressure and a pair of diaphragms positioned on opposite sides of said lever each including one side connected to said lever, means for exposing said diaphragms to the same pressures on the side thereof connected to said lever, for exposing the other side of one of the diaphragms to a substantially constant relatively high pressure and for exposing the other side of the other diaphragm to a pressure lower than the relatively high pressure by an amount proportional to said particular engine parameter between said limits.

3. A fuel control for metering fuel to a turbine engine comprising a source of fuel under pressure in quantities in excess of the volume of fuel required by the engine, governing means positionable primarily in response to a controlling engine parameter between predetermined fuel flow limits comprising maximum and minimum abutments establishing said limits, a lever pivotally mounted at one end movable between the maximum and minimum abutments at the other end and including a valve surface at said one end, a valve orifice in operative relation to said valve surface and a pair of diaphragms disposed on opposite sides of said lever having adjacent sides connected to said lever and exposed to the same pressure, the other side of one of said pair of diaphragms being exposed to a constant relatively high pressure, the other side of the other of said pair of diaphragms being exposed to a pressure which varies as the speed of the engine, valve means comprising a diaphragm actuated valve responsive to the degree of opening of the valve orifice by the valve surface for recirculating a controlled portion of the fuel and metering means responsive to said valve means for supplying the remaining portion of the fuel to the engine.

4. A fuel control for metering fuel to a turbine engine including an air compressor comprising a source of fuel under pressure in quantities in excess of the volume of fuel required by the engine, governing means positionable primarily in response to a controlling engine parameter between predetermined fuel flow limits comprising maximum and minimum abutments establishing said limits, a lever pivotally mounted at one end movable between the maximum and minimum abutments at the other end and including a valve surface at said one end, a valve orifice in operative relation to said valve surface and a pair of diaphragms disposed on opposite sides of said lever having adjacent sides connected to said lever and exposed to the same pressure, the other side of one of said pair of diaphragms being exposed to a constant relatively high pressure, the other side of the other of said pair of diaphragms being exposed to a pressure which varies as the speed of the engine, valve means comprising a diaphragm actuated valve responsive to the degree of opening of the valve orifice by the valve surface for recirculating a controlled portion of the fuel and metering means responsive to said valve means for supplying the remaining portion of the fuel to the engine, comprising a second valve orifice through which fuel for the engine must pass, a metering lever pivotally mounted at one end and having a metering valve in closing relation to the second valve orifice at the other end and a plurality of means responsive to engine parameters acting on said metering lever between the ends thereof for pivoting the metering lever about the one end thereof to vary the degree of opening of the second valve orifice including a pressure responsive bellows connected to said metering lever for movement thereof on change of pressure surrounding the bellows and means for exposing the bellows to the engine air compressor discharge pressure and a pair of metering diaphragms positioned on opposite sides of said metering lever each including one side connected to said metering lever, means for exposing said metering diaphragms to the same pressures on the side thereof connected to said metering lever, for exposing the other side of one of the metering diaphragms to a substantially constant relatively high pressure and for exposing the other side of the other metering diaphragm to a pressure lower than the relatively high pressure by an amount proportional to said particular engine parameter between said limits.

5. Structure as set forth in claim 4 wherein the plurality of means responsive to engine parameters acting on said metering lever between the ends thereof for pivoting the metering lever about the one end thereof to vary the degree of opening of the second valve orifice further includes spring biased diaphragm means positioned adjacent said one metering diaphragm for providing a bias on the lever at low engine speeds.

6. Structure as set forth in claim 5 wherein the spring biased diaphragm means is constructed and arranged to provide a bias on the lever at both low engine speeds and high engine speeds.

7. A fuel control for metering fuel to a turbine engine comprising a source of fuel under pressure in quantities in excess of the volume of fuel required by the engine, governing means positionable primarily in response to a controlling engine parameter between predetermined fuel flow limits, valve means responsive to the position of said governing means for recirculating a controlled portion of the fuel, metering means responsive to said valve means for supplying the remaining portion of the fuel to the engine and means for preventing engine turbine overspeed comprising a pressure responsive valve between said metering means and said engine operable on actuation to substantially reduce the fuel metered to the engine and a speed sensor and shut-off valve connected between said pressure responsive valve and engine turbine output shaft in series operable to actuate said pressure responsive valve on engine turbine overspeed and means for providing a minimum fuel flow through said pressure responsive valve after actuation thereof comprising an axial passage in the pressure responsive valve having radially extending connecting passages at one end and fuel discharge means at the other end and means for opening the fuel discharge means only on actuation of said pressure responsive valve.

8. Structure as set forth in claim 7 wherein the fuel control further includes a power selector lever and the pressure responsive valve further includes means for preventing other than minimum fuel flow therethrough with the power selector lever in other than an engine idle position.

References Cited by the Examiner
UNITED STATES PATENTS

| | | | |
|---|---|---|---|
| 2,588,522 | 3/1952 | Harris | 60—39.28 |
| 2,640,318 | 6/1953 | Carey | 60—39.14 |
| 2,674,847 | 4/1954 | Davies. | |
| 2,688,229 | 9/1954 | Lee | 60—39.28 |
| 2,741,086 | 4/1956 | Machlanski | 60—39.14 |
| 2,789,418 | 4/1957 | Machlanski | 60—39.14 |
| 2,892,309 | 6/1959 | Sipin | 60—39.14 |
| 2,905,431 | 9/1959 | Gilbert | 251—61 |
| 2,939,280 | 6/1960 | Farkas | 60—39.28 |
| 2,943,447 | 7/1960 | Davies | 60—39.28 |
| 2,959,002 | 11/1960 | Best | 60—39.28 |
| 2,968,151 | 1/1961 | Abraham | 60—39.28 |
| 2,980,173 | 4/1961 | Perkey | 60—39.14 |
| 2,981,271 | 4/1961 | Cowles | 60—39.28 |
| 3,021,108 | 2/1962 | Noakes | 251—61 |
| 3,076,311 | 2/1963 | Johnson | 60—39.28 |
| 3,078,669 | 2/1963 | Williams | 60—39.28 |
| 3,118,491 | 1/1964 | Simons | 60—39.28 |
| 3,131,750 | 5/1964 | Turner. | |

FOREIGN PATENTS 845,269   8/1960   Great Britain.

JULIUS E. WEST, Primary Examiner.

ABRAM BLUM, SAMUEL LEVINE, Examiners.